(12) United States Patent
Kieronski

(10) Patent No.: US 6,364,986 B1
(45) Date of Patent: Apr. 2, 2002

(54) HIGH-STRENGTH PARTS FORMED USING STEREOLITHOGRAPHY

(75) Inventor: Robert V. Kieronski, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/413,052

(22) Filed: Oct. 4, 1999

(51) Int. Cl.[7] .......................... B29C 35/08; B29C 41/32
(52) U.S. Cl. .................. 156/242; 264/250; 264/255; 264/257; 264/267; 264/279; 264/401; 264/571
(58) Field of Search .................. 264/250, 255, 264/257, 267, 279, 401, 571; 156/242

(56) References Cited

U.S. PATENT DOCUMENTS 5,059,266 A * 10/1991 Yamane et al. ......... 156/242 X
5,173,220 A * 12/1992 Reiff et al. ................. 264/401

* cited by examiner

Primary Examiner—Leo B. Tentoni
(74) Attorney, Agent, or Firm—Michael J. McGowan; Prithvi C. Lall; Michael F. Oglo

(57) ABSTRACT

High-strength parts are produced by first performing a stereolithography part generation process to create a polymer part having opposing interior surfaces. An uncured strength material is interposed between the opposing interior surfaces of the polymer part. The polymer part with the uncured strength material is then heated. The strength material is chosen to bond to the opposing interior surfaces during the heating step.

6 Claims, 2 Drawing Sheets

HIGH-STRENGTH PARTS FORMED USING STEREOLITHOGRAPHY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to manufactured parts, and more particularly to high-strength parts having exterior surfaces that are precision manufactured using a stereolithographic method/apparatus while having an interior core made from a high-strength material.

(2) Description of the Prior Art

Complex models can now be quickly and accurately made by linking computer-aided design (CAD) model specifications with a commercially available process known as stereolithography. A stereolithography apparatus (or SLA as it is known) takes CAD data and automatically produces a hard plastic pattern or model in a matter of hours. The patterns or models are three dimensional and include any design features that are made available by most general-use CAD systems. Examples of such SLA systems include those disclosed in U.S. Pat. No. 4,575,330 (Hull), U.S. Pat. No. 5,104,592 (Hull et al.), U.S. Pat. No. 5,216,616 (Masters), and U.S. Pat. No. 5,263,130 (Pomerantz et al.)

The basic concept of stereolithography is as follows. A part design is created on a CAD system and then downloaded to the control unit of an SLA. The control unit directs a movable laser beam onto the surface of a tank filled with a liquid polymer that is photo-curable. An elevator table resides just below the surface of the liquid polymer. In operation, the polymer solidifies to a thickness of approximately 0.005–0.030 inches wherever the laser beam strikes the surface of the liquid photo-curable polymer. To construct a cross-section of the part, the laser beam is scanned back and forth on the surface in the shape of the cross-section. The elevator table is then lowered a programmed amount so that the just-solidified cross-section is covered with the liquid polymer. Another cross-section of the part is then created on top of the first cross-section in the same manner as described above. The process continues until the complete part has been constructed. Finally, the part is removed from the tank and cured.

While producing complex parts accurately and quickly using stereolithography has many advantages, the cured polymer part does not typically provide the strength characteristics required of the actual part. Thus, functional testing of the SLA created part is not usually possible and must therefore be delayed until the part can be cast or machined from an appropriate strength material.

SUMMARY OF THE INVENTION

Accordingly, it is an object of the present invention to utilize the speed and accuracy of stereolithography in forming high-strength parts.

Another object of the present invention is to provide a method of making a precision manufactured part having the strength characteristics necessary for the functional testing of the part.

Other objects and advantages of the present invention will become more obvious hereinafter in the specification and drawings.

In accordance with the present invention, high-strength parts are produced by first performing a stereolithography part generation process to create a polymer part having opposing interior surfaces. An uncured strength material is interposed between the opposing interior surfaces of the polymer part. The polymer part with the uncured strength material is then heated. The strength material is chosen to bond to the opposing interior surfaces during the heating step. The strength material comprises either a mixture of an epichlorohydrin resin, a catalyst and filler particles, or a mesh wetted with a catalyzed epichlorohydrin resin.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 1A:
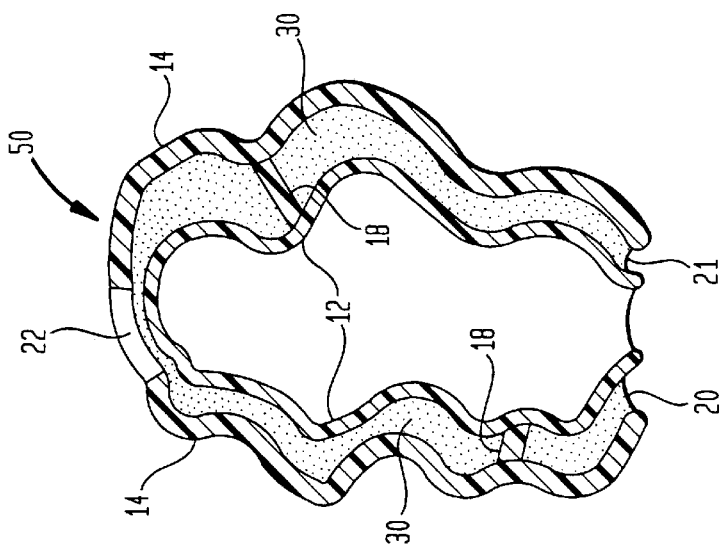
FIG. 1A is a cross-section of an arbitrarily-shaped, stereolithography-generated polymer part for use in an embodiment of the present invention.
Figure 1B:
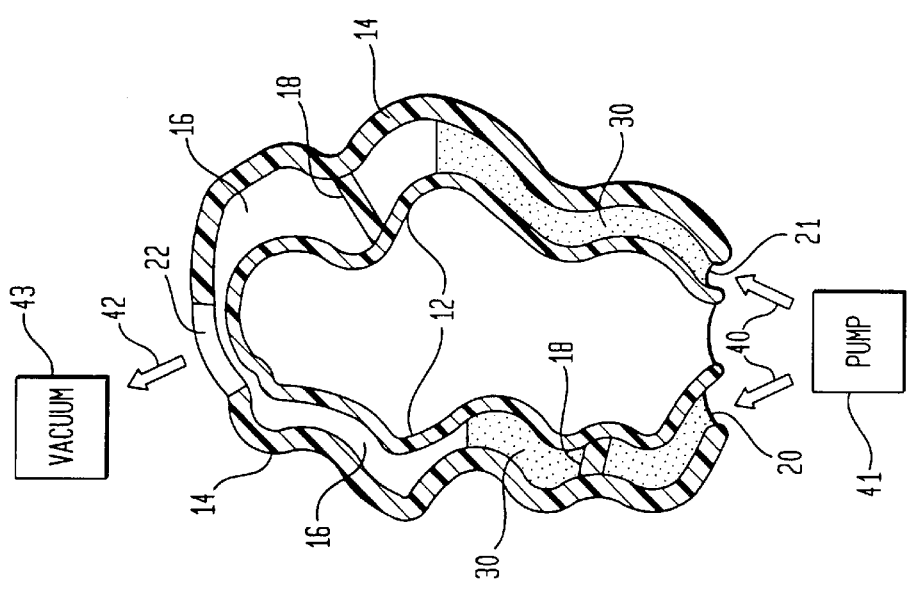
FIG. 1B is a cross-section of the part of FIG. 1A partially filled with a secondary material in accordance with the present invention.
Figure 1C:
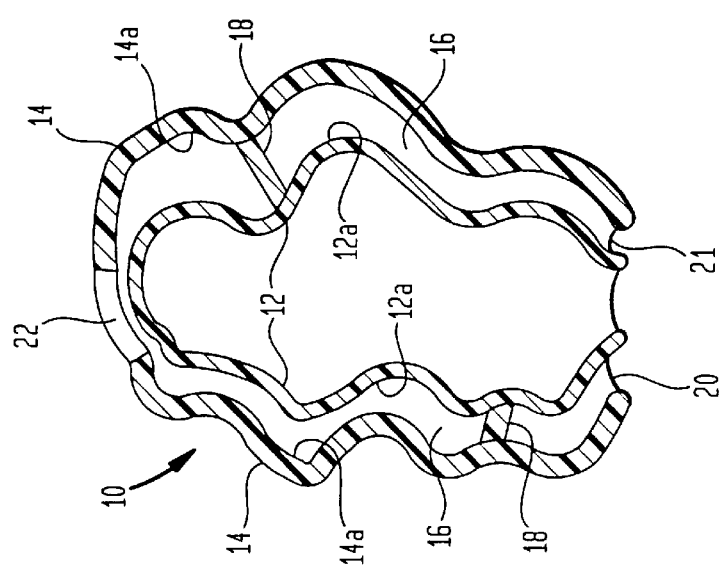
FIG. 1C is a cross-section of the high-strength part produced in accordance with the present invention.

Referring now to the drawings, and more particularly to FIGS. 1A, 1B and 1C, one embodiment of the present invention will be described. In FIG. 1A, a cross-section of an arbitrarily-shaped hollow polymer part is referenced generally by numeral 10. Part 10 is designed/constructed using a stereolithography apparatus (SLA) to achieve the desired exterior dimensions. A variety of such SLA systems are known in the art and will, therefore, not be described further. Typically, polymer part 10 is made from an epoxy resin polymer developed and sold by Ciba Geigy Corporation under the tradename CIBATOOL™ SL5180 or SL5170. However, the present invention is also compatible with other epoxy polymer systems.

In terms of the present invention, polymer part 10 is designed/constructed to have inner shell 12 with interior surface 12a and outer shell 14 with interior surface 14a. Interior surface 12a and interior surface 14a oppose one another and are separated from one another by gap 16 that is fairly uniform throughout polymer part 10 in accordance with the precision of the particular SLA system. Gap 16 is maintained by a plurality of spaced-apart internal supports 18 formed integrally with inner shell 12 and outer shell 14 of the same polymer material during the stereolithography construction process. Spacing between supports 18 is selected to provide sufficient flow area for passage of a viscous secondary material (as will be described further below), while sufficiently maintaining the integrity of gap 16. The design of polymer part 10 can be accomplished with the aid of any one of a variety of patterning software packages used in conjunction with an SLA. For example, one such patterning software package is available under the tradename QUICKCAST™ from Ciba Geigy Corporation. Briefly, the structure of polymer part 10, i.e., inner shell 12, outer shell 14 and supports 18, is photo-cured during a stereolithography process and any uncured liquid polymer is drained via, for example, holes 20, 21 and 22, thereby leaving gap 16.

With polymer part 10 constructed as in FIG. 1A, a secondary material is introduced as will be described with the aid of FIG. 1B. Like reference numerals will be used for the elements common with FIG. 1A. In this embodiment of the present invention, secondary material 30 is injected between inner shell 12 and outer shell 14 using holes 20 and 21, for example, as indicated by arrows 40. Hole 22 in this example allows the displaced air in gap 16 to escape as indicated by arrow 42. Accordingly, secondary material 30 is in a liquid state when it fills gap 16. To assure uniform filling of secondary material 30 between inner shell 12 and outer shell 14, the injection indicated by arrow 40 can be pressure assisted using pump 41 while the venting of air indicated by arrow 42 can be vacuum assisted using vacuum 43. The completely filled part, referenced generally by numeral 50 in FIG. 1C, is then heated so that secondary material 30 bonds to polymer part 10 as secondary material 30 cures. Thus, part 50 has a precision contoured exterior provided by the stereolithographic process while having a core with the strength properties of the cured secondary material 30.

In its uncured liquid form, secondary material 30 should be easily castable. Upon curing, secondary material 30 must bond with the photo-cured polymer material used in the stereolithographic part generation process. Once cured, secondary material 30 must have a coefficient of expansion similar to that of the photo-cured polymer material.

In general, when polymer part 10 is formed from an epoxy resin polymer as described above, secondary material 30 is a catalyzed epoxy resin that is mixed with filler particles for added strength. The epoxy resin for secondary material 30 should be one having its basic epoxidizing resin based on epichlorohydrin. The catalyst is chosen based upon the desired pot life. That is, if the part to be constructed were geometrically complex, a longer pot life may be desired to allow for complete filling of the stereolithographic part. For example, one catalyst which does not add to the basic viscosity of the epichlorohydrin resin is methylendomethylene (THPA). A pot life of about two hours is achieved when methylendomethylene is added to an epichlorohydrin resin at 80–90 weight percent of the epichlorohydrin resin's weight. For most applications, a two hour pot life is adequate. Other suitable catalysts include hexahydrophthalic anhydride (HHPA), dodecenylsuccinic anhydride (DDSA), and polyamide.

Immediately after mixing the resin and catalyst, strength-enhancing filler particles are added and mixed thoroughly with the mixture of resin and catalyst. The mixture of resin, catalyst and filler particles forms secondary material 30 for injection between inner shell 12 and outer shell 14. Choice of the particular material for the filler particles varies with the thickness of gap 16 and the desired strength properties of the filled polymer part. For example, for gaps up to approximately ¾ of an inch in thickness, milled glass fiber in the range of 1/32 to 1/64 of an inch in length can be added to the mixture of resin and catalyst in a proportion that is 50–60 weight percent of the resin's weight. (While strength increases with the increase in filler material, the mixture can become too viscous is if the stated proportion is exceeded.) In addition, if gap 16 is between approximately ¼ to ¾ of an inch, aluminum powder is added in a proportion up to 10 weight percent of the resin's weight. The aluminum powder aids in heat dispersion during the curing process.

After secondary material 30 (e.g., either the mixture of resin, catalyst and filler or the mixture of resin, catalyst, filler and metal powder) fills the SLA generated part, the filled part is cured. Curing is accomplished by heating the filled part to a fairly low temperature of approximately 125° F. until secondary material 30 cures to a useful strength, i.e., a strength greater than the strength of the photo-cured polymer material.

Figure 2A:
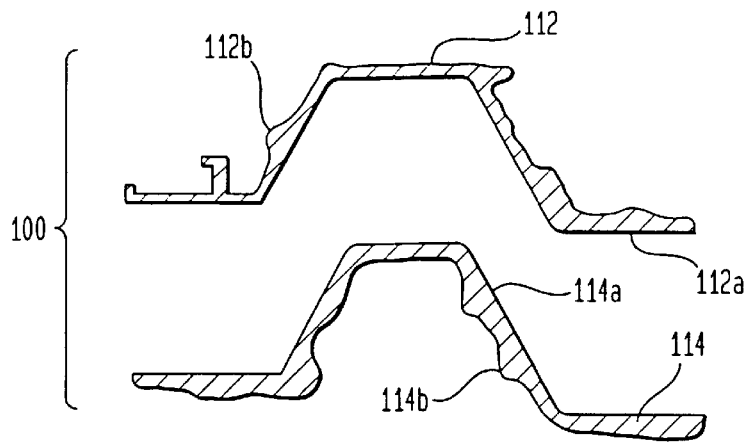
FIG. 2A is a cross-section of arbitrarily-shaped, stereolithography-generated polymer shells that can nest with one another in accordance with another embodiment of the present invention.
Figure 2B:
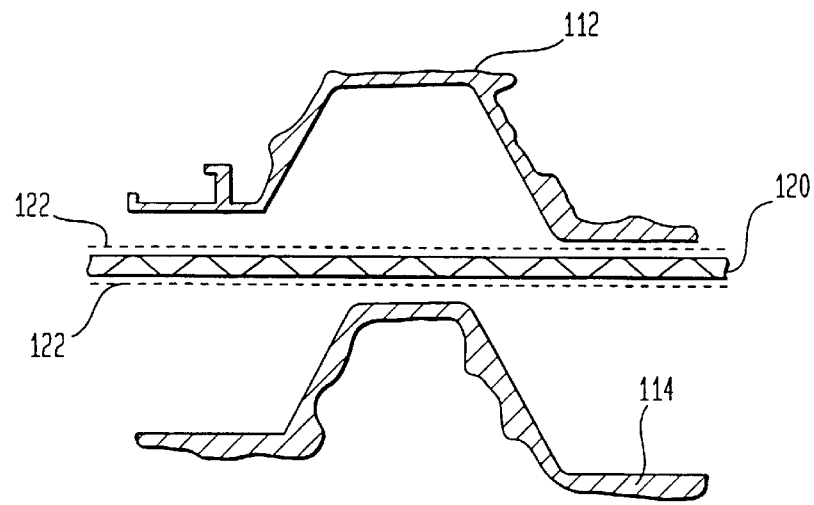
FIG. 2B is a cross-section of the polymer shells of FIG. 2A and a reinforcing mesh saturated with a catalyzed resin interposed between the shells.

The present invention can also be implemented by constructing the stereolithographic part as two arbitrarily-shaped nesting shell as will now be described with the aid of FIGS. 2A, 2B and 2C. In FIG. 2A, a cross-section is shown of polymer part 100 formed of first shell 112 and second shell 114. Surface 114a of shell 114 is contoured and shaped to nest with surface 112a of shell 112. Surfaces 112b and 114b form the exterior surfaces of part 100. As shown in FIG. 2B, a mat or mesh 120 is interposed between shells 112 and 114. As will become apparent below, mesh 120 serves as fiber reinforcement and is typically constructed from glass or graphite fiber bundled cables or tows. The mesh size and thickness are dependent on the required properties of the end part. Generally, the more mesh material, the greater the strength of the object incorporating same. Usually, the placement and orientation of the fibers are chosen such that the greatest number of uninterrupted fibers are placed along the axis where the greatest tensile strength is required.

Mesh 120 is wetted with a catalyzed resin such as the epichlorohydrin resin mixed with the methylendomethylene catalyst as described in detail above. For purpose of illustrations, the catalyzed resin is depicted in FIG. 2B as dashed lines 122 both above and below mesh 120 in order to indicate that mesh 120 is saturated with the catalyzed resin.

Figure 2C:
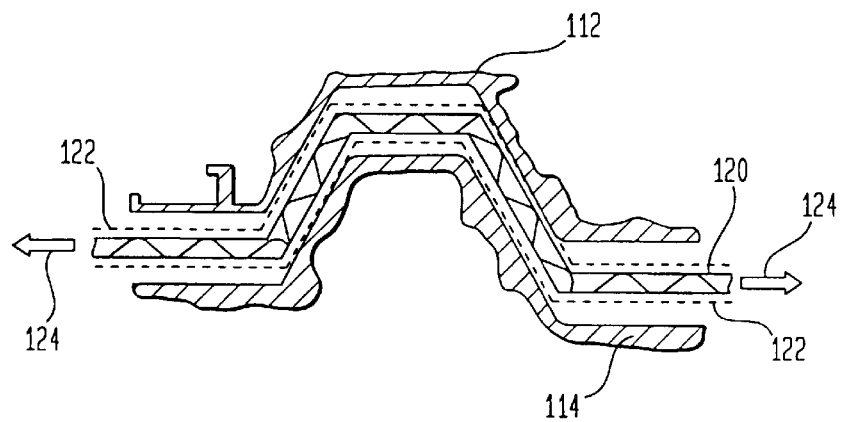
FIG. 2C is a cross-section of the polymer shells after they have been pressed together in nested engagement about the catalyzed resin-wetted reinforcing mesh used to form the high-strength part.

When shells 112 and 114 are pressed into nested engagement with one another as shown in FIG. 2C, mesh 120 saturated with catalyzed resin 122 conforms to the nested arrangement of shells 112 and 114. Further, mesh 120 separates opposing surfaces 112a and 114a to essentially define a uniform separation between shells 112 and 114 similar to the uniform gap maintained by supports 18 in the embodiment of FIGS. 1A, 1B and 1C. Any excess catalyzed resin is squeezed out of the ends of shells 112 and 114 as indicated by arrows 124. Additional vents (not shown) can also be provided in each of shells 112 and 114 for venting purposes. As with the first embodiment, a vacuum (not shown) may be applied to the various vents to assist in the removal of excess catalyzed liquid and/or air bubbles. The nested part with reinforcing mesh 120 saturated with catalyzed resin 122 is then cured at a fairly low temperature, e.g., 125° F., as described above.

The advantages of the present in invention are numerous. The accuracy and efficiency of stereolithography are combined with a strength material in a novel fashion to produce a high-strength part. In this way, a stereolithographic part can be tested for both form and function.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for producing high-strength parts, comprising the steps of:
   performing a stereolithography part generation process to create a polymer part having opposing interior surfaces;
   interposing an uncured strength material between said opposing interior surfaces; and
   heating said polymer part with said uncured strength material interposed between said opposing interior cures and bonds to said opposing interior surfaces to from high-strength parts.

2. A method according to claim 1 wherein said step of performing includes the step of generating a plurality of spaced apart internal supports integral with and between said opposing interior surfaces during said stereolithography part generation process to a gap between said opposing interior surfaces.

3. A method according to claim 2 wherein:
   said step of performing further includes the step of providing a first hole and a second hole in said polymer part, each of said first hole and said second hole communicating with said gap; and
   said step of filling includes the step of injecting said uncured strength material into said first hole.

4. A method according to claim 3 further comprising the step of applying a vacuum to said second hole while said uncured strength material is injected into said first hole.

5. A method according to claim 1 wherein:
   said step of performing creates a first shell of said polymer part and creates a second shell of said polymer part nested with said first shell to defined said opposing interior surfaces; and
   said step of filling is accomplished by sandwiching said first shell and said second shell about said uncured strength material.

6. A method according to claim 5 wherein said step of filling comprises the steps of:
   placing a mesh between said first shell and said second shell;
   wetting said mesh with a catalyzed resin to form said uncured strength material; and
   pressing said first shell and said second shell together about said mesh wetted with said catalyzed resin, wherein said mesh conforms to said opposing interior surfaces.

* * * * *